United States Patent Office 3,494,865
Patented Feb. 10, 1970

3,494,865
LIGNITE PRODUCTS AND COMPOSITIONS THEREOF
Robert S. Andrews, Jr., and William C. McDaniels, Houston, Tex., assignors to National Lead Company, New York, N.Y., a corporation of New Jersey
No Drawing. Filed Apr. 1, 1966, Ser. No. 539,312
Int. Cl. C10m *11/00;* E21b *3/02*
U.S. Cl. 252—8.5                                    12 Claims

ABSTRACT OF THE DISCLOSURE

Reaction products of humic acid with long-chain fatty acid partial amide of a polyalkylene polyamine, and oil base well-working fluids containing the same, and compositions comprising the same together with a dispersing additive. The humic acid optionally may be in part reacted with a long-chain alkyl ammonium cation.

---

This invention relates to derivatives of humic acid, as obtained, for example, from lignite, and useful compositions thereof, particularly including oil-base fluids for use in well-working operations such as drilling, fracturing, packing, and the like and including processes of drilling with such compositions.

The present invention represents an enlargement and an improvement over certain of the inventive subject matter set forth in United States Patent 3,168,475 which issued Feb. 2, 1965, to a common assignee, and the patent is hereby incorporated herein by reference.

In the rotary drilling of wells for oil and gas, drilling fluids are used which are circulated in such a manner as to remove cuttings and to support the walls of the hole. Most commonly such fluids are water base, comprising, for example, clay dispersed in water, but in recent years extensive use has been made of fluids having oil as the base, i.e., the continuous liquid vehicle.

The oily vehicle is converted into a well-working fluid suitable for the purpose at hand, such as a drilling fluid, by adding various materials thereto for a number of purposes. Thus, thickening agents may be added, so that the fluid will support cuttings and finely-divided solid additives. Again, weighting materials such as ground barite or calcite may be added to increase the density of the fluid. Also, and of great importance, substances may be added which serve to reduce the filtration of the fluid, as takes place when the fluid is in contact with permeable formations. These oil-base fluids may also contain water in the form of water-in-oil emulsion, so that the continuous phase of the fluid is still oil.

In the earlier development of oil-base fluids of the types described, primary attention was given to providing thickening additives. Many were found and have been used at various times, including carbon black; soaps of fatty acids, rosin, tall oil, and the like organic acids; asphalts of various kinds; and so forth. In recent years, however, it has become apparent that a low fluid loss is the most important characteristic of these fluids to be sought for, and that thickening to whatever degree desired can generally be readily accomplished by any of several means, provided that the fluid loss is maintained at a very small value, by reducing the ability of the fluid to undergo filtration.

The technique set forth in the aforesaid Patent 3,168,475 provides an extremely useful material for reducing filter loss in fluids of the type described. It has been found, however, that in some cases, while the thermal stability of the compounds is good, nevertheless, there is room for improvement, since use of such well-working fluids for prolonged periods at very high temperatures sometimes leads to a partial loss of the desirable properties, particularly from the standpoint of filter loss.

An object of the present invention, accordingly, is to provide a novel derivative of humic acid having broad utility.

Another object of the invention is to provide well-working fluid compositions containing the said derivative, which exhibit improved filter-loss-reducing properties as compared to those of United States Patent 3,168,475 under extreme conditions of temperature.

Other objects of the invention will appear as the description thereof proceeds.

Generally speaking and in accordance with illustrative embodiments of our invention, we react humic acid with from about 50% to about 110% of its base-combining capacity, with a fatty acid partial amide of a polyalkylene polyamine so as to produce an adduct; and furthermore, we may treat an oily liquid, which is most desirably diesel oil but which may also be any available crude oil, topped or untopped or various fractions of crude oil, including kerosene, fuel oil, and the like, with the aforementioned humic acid derivative; and, optionally, we may add thereto any of the commonly employed additives for oil-base well-working fluids of this type, which as is well known comprises ground minerals, such as barite, celestite, calcium carbonate, spent refinery clays, and the like; soaps, blown asphalts, carbon black, organophilic clays, and the like; water, and other known materials.

Humic acid is a material of wide distribution and is present in soils, peat, and coals, particularly lignite or brown coal. It is an acid in which carboxyl and phenolic hydroxyl groups contribute base-combining ability. It is soluble in alkalies, such as caustic soda and sodium carbonate, has a deep brown color, and is readily soluble in water when converted to its alkali metal salt, which may be then termed an alkali metal humate, the commonest example of which is sodium humate.

While humic acid is present in soils and peat, and may be extracted from them, for example, with dilute aqueous alkali, we prefer to obtain humic acid for the purposes of this invention in the form of lignite of high alkali solubility, of which vast deposits are found throughout the world, including, particularly, the United States, for example, in North Dakota, Texas, New Mexico, and California. While we do not mean to limit ourselves thereby, we prefer a lignite having a solubility in dilute aqueous sodium hydroxide of at least 75% by dry weight, as this provides a reasonable compromise between cost and efficacy in the final product.

The fatty acid partial amide is an amdie of a fatty acid, having from 12 to 22 carbon atoms, and which may be saturated or unsaturated, and of a polyalkylene polyamine having from three to seven amino groups, and thus including tri-amines such as di-ethylene tri-amine, tetramines such as tri-ethylene tetramine, pentamines such as tetraethylene pentamine, and higher analogs of these, up to and including seven amino groups. The amide is only partial, that is, it is such that from about one-third to two-thirds of the nitrogen atoms are present in the form of a fatty acid amide, the balance being in the form of free amino groups, except that, of course, the latter are in the pentavalent state in combination with the humic acid to form a humate. We prefer fatty acids within the broad group already specified, having from 14 to 18 carbon atoms and saturated and mono- and di-unsaturated, which of course includes the very common myristic, palmitic, stearic, oleic, and linoleic acids. These are conveniently obtainable commercially as tallow fatty acids; corn; cottonseed, and soya fatty acids; and tall oil fatty acids, all of which may be natural or hydrogenated. Of these, we prefer tall oil fatty acids. As the polyamine, we prefer tetraethylene pentamine. The adduct as described and wherein the partial amide is present to the extent of about 110% of the base-combining capacity of the humic acid probably represents salt formation for 100%, the remaining 10% being adsorption, although in view of the complicated nature of the constituents, exact structural analysis is difficult and somewhat uncertain. Also, depending upon the drying temperature, where heat is used for such a step, the adduct may undergo a certain extent of amidification where the amino groups of the polyamines are combined with the carboxyl groups of the humic acid. For all of these reasons, we find it best to describe the aforesaid inventive product as an adduct. It may also be particularly described as an oniumamino adduct of humic acid and a fatty acid partial amide of a polyalkylene polyamine, wherein the fatty acid has from 12 to 22 carbon atoms, and more especially, wherein the polyalkylene polyamine has from 3 to 7 nitrogen atoms, inclusive; and wherein "onium" refers to the fact that those nitrogens of the polyamine which combine with the humic acid are in the pentavalent form.

Generally speaking, the adducts for use in our invention may be produced by bringing together humic acid and the partial amide compound in its base form. The base and the acid neutralize each other with salt formation, so as to produce the desired adduct in accordance with this aspect of the invention. Another general method of preparation is to convert the humic acid to a simple salt by reaction with an alkali, so as to produce sodium humate, potassium humate, ammonium humate, and the like, by reaction with sodium hydroxide, potassium hydroxide, or ammonium hydroxide, respectively. The partial amide compound is caused to be present in the form of a simple salt. Thus, the free amine groups of the partial amide may be reacted with a simple acid such as hydrochloric, acetic, and the like to give the corresponding partially amidated polyalkylene polyamine chloride or acetate, respectively. This method of procedure has the advantage that such onium salts, and the simple humates as described, are both water soluble, so that solutions of each reactant may be made, and the reaction completed by mixing solutions thereof together. Water, or mixtures of water with methanol, ethanol, isopropanol, acetone, and the like may also be used.

For the purposes of the invention, the preparation of the adducts as just described may be carried out without necessarily having all of the reactants in solution. That is, the humic acid and the partial amide compound can be mixed together in a pug mill or like apparatus, conveniently with enough moisture to facilitate the mechanical handling of the mixture and to speed up the reaction. This method can also be employed where the partial amide compound is in a salt form, as, for example, the hydrochloride; and indeed, the alkali necessary to convert the humic acid to its simple salt form such as sodium humate may be included in the mixture fed to the pug mill. Thus, a mixture in suitable proportions of weathered lignite, an alkali such as sodium hydroxide or borax or a mixture thereof, and the selected partial amide salt, with or without added water (or aqueous lower alcohol or ketone) may be passed through a pug mill to produce the inventive product. Where a long-chain alkyl ammonium cation is also incorporated as explained hereinbelow, this may be added along with the mixture of reactants fed to the pug mill at the same time.

Subsequent to the production of the adduct, it may be used as such, or it may be dried, with or without subsequent grinding. Where drying is carried out, it may be at relatively low temperatures, such as 100–120° C.; or it may be at a higher temperature, such as, for example 300° C. In general, we prefer drying at from 200° C. to 400° C., and grinding the dried product, for example, to pass a 100-mesh screen. Such a product is easily stored, readily handled, and easy to incorporate in various compositions in which our inventive product is used.

Where the full base-combining capacity of the humic acid has not been utilized, that is, when the partial amide has been combined with the humic acid in an equivalent proportion of less than 100% of the base-combining ability of the humic acid, we may, optionally although not necessarily, utilize the remaining base-combining capacity for reaction with an alkyl ammonium cation in which at least one alkyl radical is present which has from 12 to 22 carbon atoms in a straight chain, as described in United States Patent 3,168,478. Typical of such alkyl ammonium cations are dimethyldioctadecylammonium; dimethylcetyloctadecylammonium; didecylammonium; octadecylammonium; and the like.

Our inventive adducts, whether or not containing the alkyl ammonium cations just referred to, may be used as produced, and preferably after drying and grinding for inclusion in well-working fluids of the type already described. A certain amount of agitation, particularly at elevated temperatures, is generally necessary to effect good dispersion of our inventive adducts in such fluids. Generally, means will be present at the well site for obtaining such agitation and heat; and even when these are lacking, subsequent use of the well-working fluids, particularly where circulation at high bottom-hole temperatures is involved, will bring about the desired dispersion. Generally, where the base fluid has some aromatic content, as is the case with crude oils in certain oil fields, dispersion will be rapid indeed.

In many cases it will be desirable to expedite the dispersion of our inventive adducts in the well-working fluids, without depending upon down-in-the-hole circulation. This is particularly desirable where the base oil of the well-working fluid is essentially paraffinic in nature. In that case, any of several dispersant additives may be included with our adduct, such as any of the dispersing additives described and presently claimed in application Ser. No. 332,279, filed Dec. 20, 1963, now Patent No. 3,379,650, issued Apr. 23, 1968, and assigned to a common assignee. The contents of that application are incorporated herein by reference. Thereby disclosed herein (and in that application) are, particularly, nonyl phenol, octyl phenol, phenol, alkyl phenols generally from methyl through dodecyl, pentachlorophenol, salicyclic acid, benzoic acid, phthalic acid, and the like. Of these, we prefer nonyl phenol, as it is effective, easily handled, and widely obtainable commercially. As is well-known in organic chemistry, the alkyl groups methyl, octyl, nonyl, and dodecyl each contain respectively 1, 8, 9, and 12 carbon atoms.

Where such a dispersing additive is used, it may be present in any amount which is lesser than the amount of the inventive adduct. A range which has been found practical, balancing cost against benefits received, is from about 8% to 10% by weight of the adduct.

We now give some examples showing the practice of our invention:

Example 1

950.4 grams of commercial tall oil fatty acid was mixed with 249.6 grams of commercial tetraethylene pentamine (thus, 3.25 and 6.50 gram equivalents respectively, so that about half of the amino groups of the tetraethylene pentamine were neutralized) and the mixture heated to 400° F. for one hour. It was cooled, and the phosphate salt prepared by mixing with 3.25 gram equivalents of phosphoric acid. 200 grams of powdered weathered North Dakota lignite (having an alkali solubility of about 80%) and 200 grams of the fatty acid partial amide phosphate salt were added to 400 grams of diesel oil, and the mixture heated to 230° C. for about thirty minutes. This brought about the production of an adduct in accordance with the invention, the adduct being dispersed in the form of a relatively thick paste in the diesel oil.

Example 2

To 350 ml. of diesel oil, 30 grams of the product of Example 1 was added, and the mixture stirred. Thus, the final composition was about 380 ml. diesel oil and 15 grams of the adduct proper. This was tested as a well-working fluid for filtration loss in accordance with the Americal Petroleum Institute testing procedure, and gave a fluid loss of 2.5 ml. in thirty minutes.

Example 3

A well-working fluid of the weighted type was prepared by mixing together 192 ml. diesel oil, 30 grams of the product of Example 1 (and thus containing 15 grams of the inventive adduct), 6 grams of dimethyldioctadecyl-ammonium attapulgite, and 470 grams of 325-mesh barite, giving a total volume of 350 ml. This was tested as described in Example 2, and gave a fluid loss of 0.5 ml.

Example 4

A production-size pug mill was fed continuously with the following materials at the rates specified:

Lignite, 80% alkali solubility _____ lbs./min__ 4.2
Tall oil fatty acid half amide of tetraethylene pentamine, as described in the first sentence of Example 1 _____ lbs./min__ 4.0
Water _____ lbs./min__ 1.2
Nonyl phenol _____ lbs./min__ 0.3

The lignite and the half amide, preheated to 150° F., were fed to an eight-foot cut-flight conveyor preceding the pug mill, and thus thoroughly mixed. The water was introduced as the mixed material entered the pug mill. The nonyl phenol was injected into the pug mill about two feet from the exit head, the pug mill being six feet long. A hot, fully reacted adduct emerged from the pug mill, and was tray-dried at 150° F.–200° F. for several hours, and then ground so that 90% passed a 100-mesh screen.

When one gram of the product was dispersed in 350 ml. diesel oil so as to produce a well-working fluid, an A.P.I. fluid loss of less than 2.0 ml. was obtained.

Example 5

An adduct in accordance with the invention was prepared, in which a minor proportion of the acid sites of the lignite was occupied by a long-chain ammonium cation, as set forth hereinabove.

The following materials were put in a reaction vessel fitted with an agitator and with heating means, and mixed at 180° F. for 30 minutes:

Water _____ gallons__ 1620
Lignite, as in Example 1 _____ pounds__ 2250
Borax _____ do____ 810

The following long-chain onium salt was then added, and agitation continued for about one hour:

Pounds
Dimethyl-di-hydrogenated tall oil fatty ammonium chloride _____ 563

A mixture of the following components was prepared, added to the rest in the vessel, and allowed to react for 15 minutes:

Pounds
Tall oil fatty acid half amide as in Example 4 ____ 1687
Isopropyl alcohol _____ 450
Hydrochloric acid, 20° Baumé _____ 400

The following materials were then added and allowed to mix for 10 minutes; the kaolin was a grinding aid:

Pounds
Kaolin _____ 300
Nonyl phenol _____ 450

The solids, which consisted of the inventive adduct intermixed with the kaolin, were filtered off, dried in a rotary dryer, and ground.

Example 6

The product of Example 5 was tested in a well-drilling fluid, and compared with a similar well-drilling fluid containing instead a control made in the same way as the adduct of Example 5 except that all of the base-combining capacity of the lignite was reacted wtih dimethyl-di-hydrogenated tall oil fatty ammonium chloride. No half-amide was used in this control. It thus corresponded to the inventive product of U.S. 3,168,475.

The test muds were compounded of 228 ml. diesel oil; 15 grams of a commercial mud invert-emulsifier which was essentially a calcium tall oil soap; 2 grams of dimethyldioctadecylammonium attapulgite; 122 ml. water; 500 grams barite; and 10 grams of either the product of Example 5 or the control as already described, to give a total volume per sample of 350 ml.

The mud samples were treated and tested as shown in the following tabulation:

|  | Ex. 5 | Control |
|---|---|---|
| Values obtained after stirring for 20 minutes and hot-rolling for 16 hours at 150° F.: | | |
| Plastic viscosity, cp | 48 | 48 |
| Yield point, lb./100 sq. ft | 4 | 6 |
| Filtrate, A.P.I., ml | 0 | 0 |
| Filtrate at 300° F. and 500 p.s.i., ml | 2.0 | 3.0 |
| Values obtained after static aging at 300° F. for sixteen hours: | | |
| Filtrate, A.P.I., ml | 0 | 0 |
| Filtrate at 300° F. and 500 p.s.i., ml | [1] 2.8 | [2] 7.2 |

[1] Regular 30-minute test.
[2] Lost 7.2 ml. in one minute.

While we have illustrated our invention by the use of specific ingredients, reaction conditions, and the like, it will be understood that numerous variations, equivalents, and alternatives may be employed in its practice, all within the scope of the claims which follow.

Having described our invention, we claim:

1. A composition of matter consisting essentially of a salt of humic acid and a fatty acyl partial amide of a polyalkylene polyamine having from 3 to 7 amino groups, in which said partial amide has fatty acyl to the extent of between one third and two thirds of the nitrogen atoms of said polyamine and wherein said fatty acyl radical has from 12 to 22 carbon atoms and said partial amide is present from about 50 to about 110 percent of the base combining capacity of said humic acid, together with an effective dispersing amount but less than that of said salt of a dispersing additive selected from the group consisting of phenol, alkyl phenols in which said alkyl group has from 1 to 12 carbon atoms, pentachlorophenol, salicylic acid, benzoic acid, and phthalic acid.

2. The composition in accordance with claim 1 in which said dispersing additive is nonyl phenol.

3. A composition of matter in accordance with claim 1 in which said percentage is less than 100%, and the remainder of said base-combining capacity is neutralized with an alkyl-substituted ammonium cation in which at least one alkyl thereof has between 12 and 22 carbon atoms.

4. The composition in accordance with claim 3 in which said dispersing additive is nonyl phenol.

5. An oil base well-working fluid consisting essentially of a major proportion of oil and a minor proportion but sufficient to substantially lower the filter loss of a salt of humic acid and a fatty acyl partial amide of a polyalkylene polyamine having from 3 to 7 amino groups, in which said partial amide has fatty acyl to the extent of between one third and two thirds of the nitrogen atoms of said polyamine and wherein said fatty acyl radical has from 12 to 22 carbon atoms and said partial amide is present at from about 50 to about 110 percent of the base combining capacity of said humic acid.

6. An oil base-well working fluid in accordance with claim 5 in which said percentage is less than 100%, and the remainder of said base-combining capacity is neutralized with an alkyl-substituted ammonium cation in which at least one alkyl thereof has between 12 and 22 carbon atoms.

7. A fluid in accordance with claim 5 in which a dispersing additive selected from the group consisting of phenol, alkyl phenols in which said alkyl group has from 1 to 12 carbon atoms, pentachlorophenol, salicyclic acid, benzoic acid, and phthalic acid is present in an effective dispersing amount but less than that of said salt.

8. A fluid in accordance with claim 7 in which said dispersing additive is nonyl phenol.

9. A fluid in accordance with claim 6 in which a dispersing additive selected from the group consisting of phenol, alkyl phenols in which said alkyl group has from 1 to 12 carbon atoms, pentachlorophenol, salicyclic acid, benzoic acid, and phthalic acid is present in an effective dispersing amount but less than that of said salt.

10. A fluid in accordance with claim 9 in which said dispersing additive in nonyl phenol.

11. In a process for drilling a well wherein there is circulated in the well an oil-base drilling fluid subject to filtration into permeable formations penetrated by the well, the method of maintaining said filtration at a selected low value during said drilling which comprises adding with said drilling fluid a salt of humic acid and a fatty acyl partial amide of a polyalkylene polyamine having from 3 to 7 amino groups, in which said partial amide has fatty acyl to the extent of between one third and two thirds of the nitrogen atoms of said polyamine and wherein said fatty acyl radical has from 12 to 22 carbon atoms and said partial amide is present at from about 50 to about 110 percent of the base-combining capacity of said humic acid.

12. The process in accordance with claim 11 in which said percentage is less than 100%, and the remainder of said base-combining capacity is neutralized with an alkyl-substituted ammonium cation in which at least one alkyl thereof has between 12 and 22 carbon atoms.

References Cited

UNITED STATES PATENTS

| | | | |
|---|---|---|---|
| 2,598,213 | 5/1952 | Blair | 252—8.55 |
| 3,168,475 | 2/1965 | Jordan et al. | 252—8.5 |
| 3,379,650 | 4/1968 | Beasley et al. | 252—8.5 |

HERBERT B. GUYNN, Primary Examiner

U.S. Cl. X.R.

252—8.55, 308; 260—404.5